(12) United States Patent
Barr

(10) Patent No.: US 7,577,850 B2
(45) Date of Patent: Aug. 18, 2009

(54) SECURITY APPLICATION USING SILICON FINGERPRINT IDENTIFICATION

(75) Inventor: David A. Barr, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 847 days.

(21) Appl. No.: 11/107,287

(22) Filed: Apr. 15, 2005

(65) Prior Publication Data

US 2006/0236123 A1    Oct. 19, 2006

(51) Int. Cl.
*G06F 11/30* (2006.01)
(52) U.S. Cl. ...................................... 713/189
(58) Field of Classification Search ............... 713/189; 714/704, 746; 716/1
See application file for complete search history.

(56) References Cited

U.S. PATENT DOCUMENTS 6,161,213 A * 12/2000 Lofstrom ....................... 716/4
2006/0210082 A1* 9/2006 Devadas et al. ............. 380/277

* cited by examiner

*Primary Examiner*—Matthew B Smithers
*Assistant Examiner*—Ali S Abyaneh
(74) *Attorney, Agent, or Firm*—Christopher P. Maiorana, PC

(57) ABSTRACT

A method for using an identification value for a security application is disclosed. The method may include the steps of (A) generating the identification value based on a plurality of semiconductor fabrication process variations, (B) generating a key by reducing a bit error rate of the identification value, wherein the key may not be available external to the security application and (C) generating an output signal by one of (i) encoding and (ii) decoding an input signal in response to said key.

18 Claims, 3 Drawing Sheets

US 7,577,850 B2

SECURITY APPLICATION USING SILICON FINGERPRINT IDENTIFICATION

FIELD OF THE INVENTION

The present invention relates to digital rights management generally and, more particularly, to security applications using a silicon fingerprint identification.

BACKGROUND OF THE INVENTION

An advantage for some security applications would be to keep a unique chip identification value a secret. If the chip identification value could be read from outside the packaged chip, then the secret would be exposed to hackers. If the chip identification value were kept confined inside the packaged chip, and used only by internal chip resources, then efforts by hackers to discover the secret are greatly frustrated. Furthermore, if each chip contains a statistically-unique identification value, no global secret (i.e., shared among devices of the same category) would exist to be discovered. The absence of a global secret greatly reduces a payoff of any hacking effort and thus should reduce an amount of effort a hacker would be willing to invest in mounting an attack.

Problems with using chip identification values for cryptography are cost or repeatability. On-chip programmable read only memory cells, nonvolatile memory cells, fusible links and laser trimmed circuits use special fabrication processing and/or extra programming steps to establish the identification value. Random identification values established during fabrication produce measured values that are not perfectly repeatable. See U.S. Pat. No. 6,161,213 issued to Lofstrom where variations between MOSFET pairs are measured to generate a "silicon" identification value. Due to measurement fluctuations when the two MOSFETs both have similar channel cutoff voltages, a bit error rate (BER) of about 1 to 2 percent can arise between successive readouts. A varying silicon identification value used as a cryptographic key value cannot tolerate random changes (i.e., a decryption key measured at a particular time would not correspond to an encryption key measured at another time).

SUMMARY OF THE INVENTION

The present invention concerns a method for using an identification value for a security application. The method generally comprises the steps of (A) generating the identification value based on a plurality of semiconductor fabrication process variations, (B) generating a key by reducing a bit error rate of the identification value, wherein the key may not be available external to the security application and (C) generating an output signal by one of (i) encoding and (ii) decoding an input signal in response to said key.

The objects, features and advantages of the present invention include providing a silicon fingerprint identification for security applications that may (i) be non-clonable, (ii) be tamper-proof, (iii) provide a read-only unique identification, (iv) operate without programming steps, (v) operate without on-chip nonvolatile memory, (vi) operate without device-unique Flash images, (vii) be well suited for localized encryption and decryption, (viii) maintain a unique identification value totally within a chip and/or (ix) bury a root-of-trust inside the silicon.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
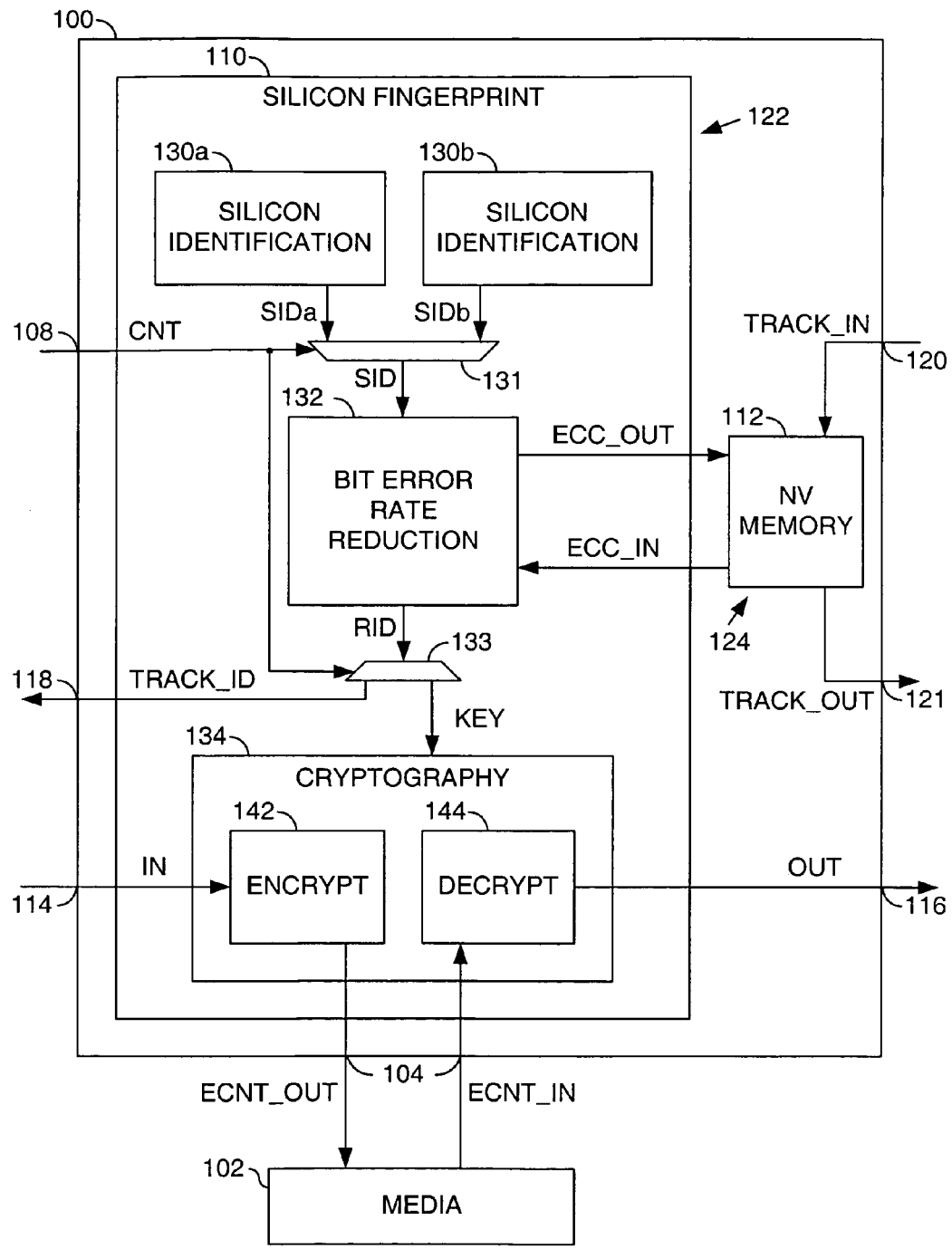
FIG. 1 is a block diagram of circuit in accordance with a preferred embodiment of the present invention.

Referring to FIG. 1, a block diagram of circuit 100 is shown in accordance with a preferred embodiment of the present invention. The circuit (or system) 100 may be referred to as a identification (ID) circuit. The ID circuit 100 may communicate with a media 102 through an interface 104 for sending and/or receiving encrypted content. The ID circuit 100 may optionally receive a signal (e.g., CNT) through an interface 108 to command a presentation of a tracking identification value.

The ID circuit 100 generally comprises a circuit (or module) 110 and an optional circuit (or module) 112. In an encryption application, an input signal (e.g., IN) may be received at an input 114 by the circuit 110 and an output signal (e.g., ECNT_OUT) may be presented by the circuit 110 to the media 102. In a decryption application, an input signal (e.g., ECNT_IN) may be received from the media 102 and an output signal (e.g., OUT) may be presented from the circuit 110 at an output 116.

An optional signal (e.g., ECC_OUT) may be presented from the circuit 110 to the circuit 112. The circuit 112 may present an optional signal (e.g., ECC_IN) back to the circuit 110. An optional signal (e.g., TRACK_ID) may be presented by the circuit 110 at an output 118 of the ID circuit 100. An optional signal (e.g., TRACK_IN) may be received by the circuit 112 at an input 120 of the ID circuit. An optional output signal (e.g., TRACK_OUT) may be presented by the circuit 112 at an output 121 of the ID circuit 100.

The media 102 can be for storage, or transmission (e.g., via the internet) and may be implemented as optical, magnetic, radio-frequency or other similar media suitable for conveying protected data. The media 102 may be a read-only media, such as an optical disk. A read-only media 102 may be suitable for distributing encrypted content to be playable only on designated players incorporating the ID circuit 100. The media 102 may be a readable and writable media, such as a hard drive. For example, the ID circuit 100 may be incorporated into a disk controller. All information written to the disk drive may be first encrypted by the ID circuit 100 and then decrypted upon reading.

The circuit 110 may be referred to as a silicon fingerprint circuit. The silicon fingerprint circuit 110 may be operational to generate an internal silicon identification value. The silicon fingerprint circuit 110 may be operational to encrypt the signal IN based on the silicon identification value to present the signal ECNT_OUT. The silicon fingerprint circuit 110 may also be operational to decrypt the signal ECNT_IN based on the silicon identification value to present the signal OUT.

The signal TRACK_ID may be generated by the silicon fingerprint circuit 110 to allow tracking of a die 122 on which the silicon fingerprint circuit 110 is fabricated. The signal ECC_OUT may be generated by the silicon fingerprint circuit. The silicon fingerprint circuit 110 may use the signal ECC_IN to identify and correct for bit errors made in various measurements of the silicon identification value. The signal ECC_OUT may be calculated based on the silicon identification value.

The circuit 112 may be referred to as a memory circuit. The memory circuit 112 is generally fabricated on a die 124 separate from the die 122. The memory circuit 112 may be operational to store the error correction code value calculated by the silicon fingerprint circuit 110. The memory circuit 112 may receive (write) the error correction code value via the signal ECC_OUT and return (read) the error correction code value via the signal ECC_IN.

In order for the silicon ID value to be useful for content security, a cryptographic system within the ID circuit 100 should be designed to cope with the anticipated bit error rates. By recording all silicon ID values during wafer sort, and by using bit-strings that are long enough to sufficiently resolve statistical overlap, a correlation among particular subsequent measurements with the original measurements recorded at wafer sort may be possible. For example, the correlation may be done by comparing a Hamming Distance of subsequent measurements from a set of expected values (as recorded at wafer sort). Details of the correlation technique are generally described in U.S. Pat. No. 6,161,213 issued to Lofstrom, hereby incorporated by reference in its entirety. The correlation approach could be used for content security applications, but the large set of expected values may be consulted (e.g., from local storage, or via network access) to resolve the stable ID value. Furthermore, the correlation approach generally exposes silicon ID values outside the chip 122.

In one embodiment, a statistical technique for resolving a stable silicon ID value may be implemented. Generally, the silicon ID value may undergo a surjection that combines many error-prone measured values into a single stable value. Therefore, silicon ID values (e.g., from repeated samples of a module generating the silicon ID value) may be mapped many-to-one to determine the stable silicon ID value.

In another embodiment, the instability of the measured silicon ID value may be corrected using error correction codes (ECC). Each silicon fingerprint circuit 110 may calculate an ECC value that is unique to the secret silicon ID value on that particular chip 122. The ECC value may be transferred to the memory circuit 112 via the signal ECC_OUT for storage. Subsequent measurements of the silicon ID value may be compared against the ECC value (read through the signal ECC_IN) to detect and correct any instability, resulting in a stable silicon ID value. The longer the ECC value is made, the more instability that may be corrected. By storing the ECC value outside the silicon fingerprint chip 122, the ECC value may get exposed to hackers. However, the ECC value alone is generally insufficient to recreate the silicon ID value. The shorter the ECC value, the less probability that information may be leaked about the silicon ID value. As an example, the ECC value may have a length of only half that of the resolved silicon ID value, so the ECC value could not carry enough information to fully leak the secret silicon ID value. In one embodiment, the ECC value may be stored and available only within the silicon fingerprint chip 122.

An example surjection technique may be a quantization process that converts a relatively long (but unstable) string of measured bits for the silicon ID value into a shorter silicon ID value that may be stable enough to be relied upon. The longer the input raw string and the shorter the output string, the more stable should be the resolved silicon ID value. Other surjection techniques may be implemented to meet the criteria of a particular application. Either the surjection and/or ECC approach may be used alone or in combined for more effect. The approaches will generally work for chip ID technologies other than the silicon fingerprint ID technology described herein.

The silicon fingerprint circuit 110 generally comprises a circuit (or module) 130a, an optional circuit (or module) 130b, an optional multiplexer 131, a circuit (or module) 132, an optional demultiplexer 133 and a circuit (or module) 134. A signal (e.g., SIDa) may be presented from the circuit 130a to the circuit 132 thru the multiplexer 131. A signal (e.g., SIDb) may be presented from the circuit 130b to the circuit 132 thru the multiplexer 131. A signal (e.g., RID) may be presented from the circuit 132 to the multiplexer 133. The demultiplexer 133 may route the signal RID to the circuit 134 as a signal (e.g., KEY) or to the output 118 as the signal TRACK_ID based on a condition of the signal CNT. In designs that do not include the signal TRACK_ID, the silicon ID circuit 130b, the multiplexer 131 and the demultiplexer 133 may be eliminated.

The circuit 132 may be configured to generate the signal ECC_OUT. The circuit 132 may also be configured to receive the signal ECC_IN. The circuit 134 may be configured to generate the signal ENC_OUT by encrypting the signal IN using a value in the signal KEY. The circuit 134 may also be configured to generate the signal OUT by decrypting the signal ECNT_IN using the value in the signal KEY.

The circuits 130a and 130b may each be referred to as a silicon ID circuit. Each of the silicon ID circuits 130a-130b may be operational to generate a unique silicon ID value based on multiple fabrication parameters established during the fabrication of the chip 122. Details of the silicon ID circuits 130a-130b may be found in U.S. Pat. No. 6,161,213, issued to Lofstrom. The silicon ID values generated by the silicon ID circuit 130a-130b may be carried in the respective signals SIDa and SIDb to the multiplexer 131. Statistically, the first silicon ID value and the second silicon ID value should be different from each other.

The multiplexer 131 may route a first silicon ID value in the signal SIDa to the circuit 132 via the signal SID while the control signal CNT is in an asserted state. The demultiplexer 133 may route a first reduced bit error rate (BER) silicon ID value in the signal RID from the circuit 132 to the circuit 134 via the signal KEY. The first reduced BER silicon ID value may be used as a cryptographic key value by the circuit 134.

The multiplexer 131 may route a second silicon ID value in the signal SIDb to the circuit 132 via the signal SID while the control signal CNT is in a deasserted state. The demultiplexer 133 may route a second reduced BER silicon ID value in the signal RID from the circuit 132 to the output 108 via the signal TRACK_ID while the control signal CNT is in a deasserted state. The second reduced BER silicon ID may be used as an identification value for tracking/identifying the die 122 at some later date. Since the second reduced BER silicon ID value should be different from the first reduced BER silicon ID value, knowledge of the second reduced BER silicon ID value should reveal nothing about the first reduced BER silicon ID value used as the secret key for cryptography.

The circuit 132 may be referred to as a bit error rate reduction circuit, or reduction circuit for short. The reduction circuit 132 may be operational to reduce bit errors in the silicon ID value. The resulting stable silicon ID value (e.g., the first reduced BER silicon ID value or the second reduced BER silicon ID value) may be presented in the signal RID. The reduction circuit 132 may stabilize the silicon ID value using one or more of the surjection and/or error correcting techniques.

The circuit 134 may be referred to as a cryptography circuit. The cryptography circuit 134 may be operational to encrypt the signal IN using the signal KEY to present the signal ECNT_OUT. The cryptography circuit 134 may also be operational to decrypt the signal ECNT_IN using the signal KEY to present the signal OUT. In one embodiment, the cryptography circuit 134 may be implemented as an encryption-only circuit. In another embodiment, the cryptography circuit 134 may be implemented as a decryption-only circuit. In still another embodiment, the cryptography circuit 134 may be implemented to both encrypt and decrypt.

The cryptography circuit 134 generally comprises a circuit (or module) 142 and a circuit (or module) 144. The circuit 142 may be referred to as an encryption circuit. The encryption circuit 142 may be operational to encrypt the signal IN to present the signal ECNT_OUT. The encryption process is generally determined by the first reduced BER silicon ID value received in the signal KEY used as a secret key.

The circuit 144 may be referred to as a decryption circuit. The decryption circuit 144 is generally operational to decrypt the signal ECNT_IN to generate the signal OUT. The decryption operation may be based on the secret key (e.g., first reduced BER silicon ID value) received in the signal KEY.

In one embodiment, the memory circuit 112 may be used to store information for tracking the ID circuit 100 at some later date. The signal TRACK_IN may be used to write a unique identification value into the memory circuit 112 for storage. The signal TRACK_OUT may be used to read the unique identification value from the memory circuit 112.

Figure 2:
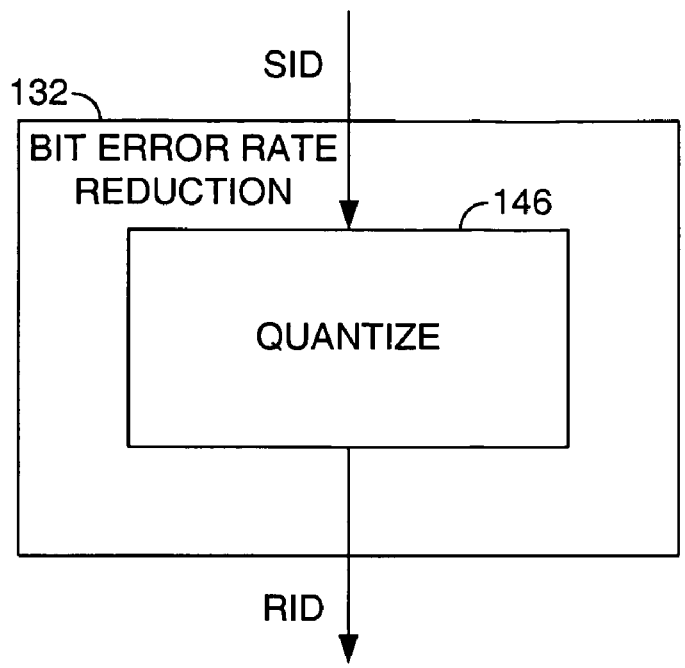
FIG. 2 is a block diagram of a first example implementation of a reduction circuit.

Referring to FIG. 2, a block diagram of a first example implementation of the reduction circuit 132 is shown. The reduction circuit 132 generally comprises a circuit (or module) 146. The circuit 146 may be referred to as a quantize circuit. The quantize circuit 146 may be operational to generate the signal RID by quantizing the silicon ID value within the signal SID. Since the quantization operation generally is not depended upon the error correction codes, the memory circuit 112 may be eliminated from the ID circuit 100.

Figure 3:
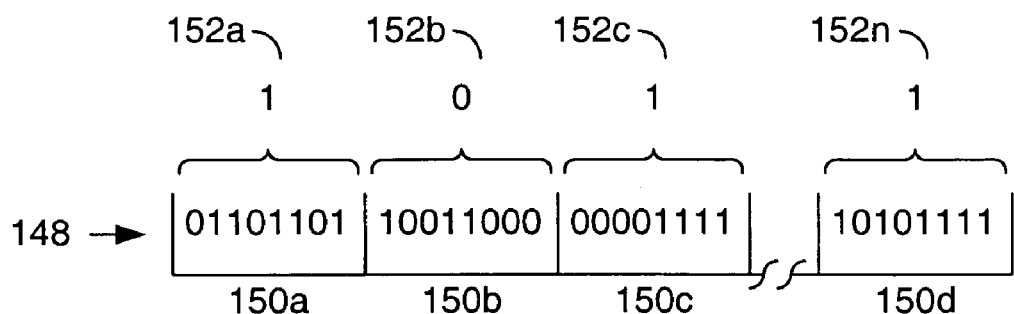
FIG. 3 is a diagram of an example quantization.

Referring to FIG. 3, a block diagram of an example quantization is illustrated. The silicon ID value may be represented as a string 148 of binary numbers. The quantization operation generally divides the string 148 into multiple bins 150a-150n. The quantize circuit 146 may count a number of bits in each of the bins 150a-150n having a predetermined logic state and then compare the count against a predetermined threshold. For example, if half or more of the bits in any particular bin 150 are in a first logic state (e.g., a logical 1 state), then the bin (e.g., 150a) may be quantized to the first logic state. As such, the corresponding bit in the stable silicon ID value (e.g., 152a) may be assigned the first logic state. If the number of bits in the first logic state is less than the predetermined threshold (e.g., bin 150b), then an associated bit (e.g., 152b) in the signal KEY may be assigned to a second logic state (e.g., a logical 0 state). The quantization operation may continue for each of the bins 150a-150n.

The quantization process generally makes the signal RID immune to signal bit flips within any given bin 150a-150n. In many cases, a bin may experience multiple bit flips and still produce the same results in the signal RID. For additional stability, the bits 152a-152k may be binned and requantized again one or more times before being presented in the signal RID. Other forms of quantization and other levels of quantization may be implemented to meet the criteria of a specific application.

Figure 4:
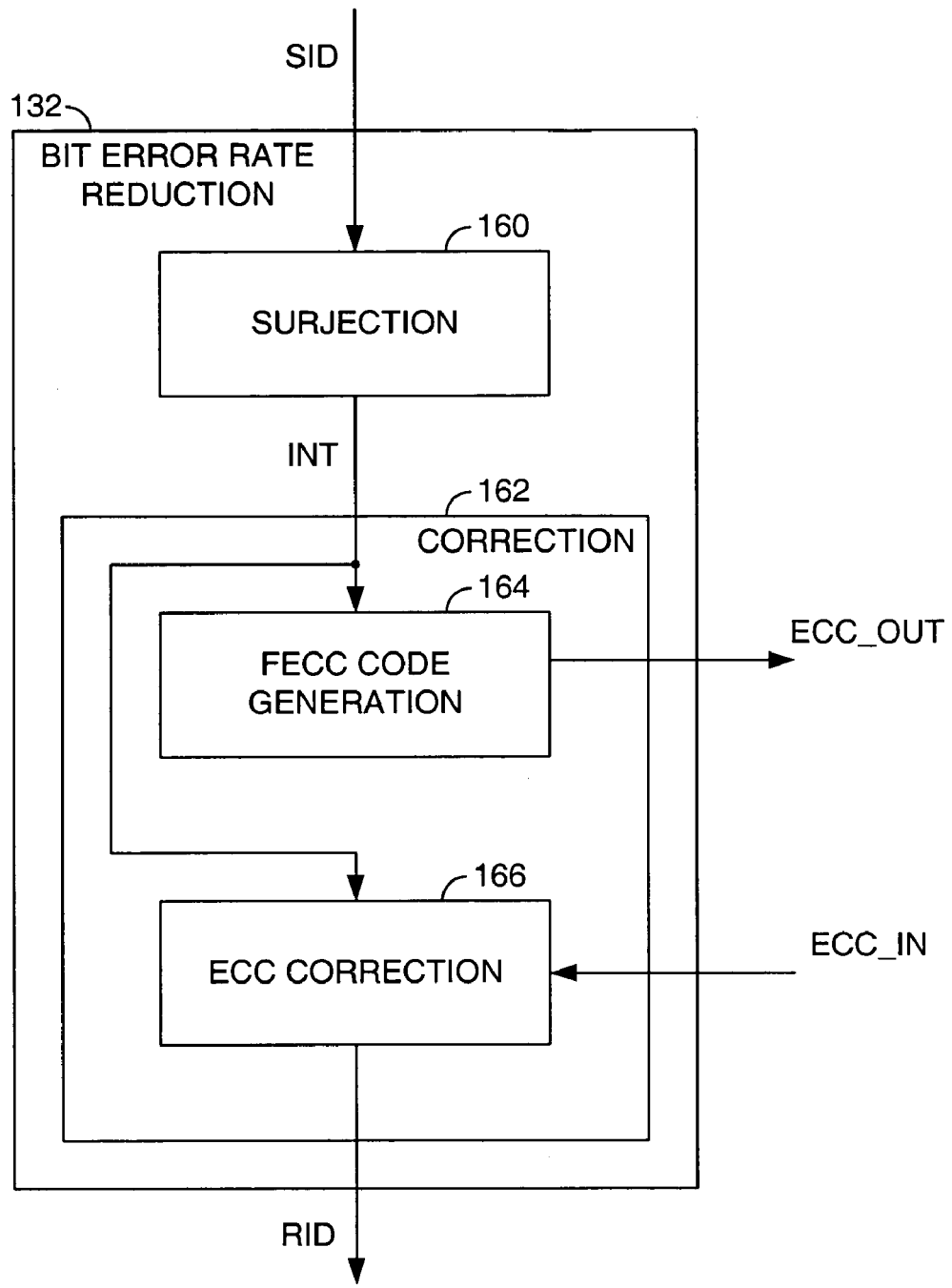
FIG. 4 is a block diagram of a second embodiment of the reduction circuit.

Referring to FIG. 4, a block diagram of a second embodiment of the reduction circuit 132 is shown. The reduction circuit 132 generally comprises a circuit (or module) 160 and a circuit (or module) 162. The circuit 160 may receive the signal SID. A signal (e.g., INT) may be presented from the circuit 160 to the circuit 162. The circuit 162 may also receive the signal ECC_IN. The circuit 162 may present the signal RID and the signal ECC_OUT.

The circuit 160 may be referred to as a surjection circuit. The surjection circuit may be operational to generate the signal INT based on the signal SID. The surjection circuit 160 may provide a level of stabilization to the silicon ID value received in the signal SID. The surjection circuit 160 may be implemented as the quantize circuit 146 or other suitable circuit.

The circuit 162 may be referred to as a correction circuit. The correction circuit 162 generally comprises a circuit (or module) 164 and a circuit (or module) 166. Both circuits 164 and 166 may receive the signal INT. The circuit 166 may also receive the signal ECC_IN. The signal ECC_OUT may be generated by the circuit 164. The signal RID may be generated by the circuit 166.

The circuit 164 may be referred to as a forward error correction coding (FECC) circuit. The FECC circuit 164 may be operational to generate the error correction code value for the silicon ID value received in the signal INT. The error correction code value may be presented in the signal ECC_OUT. Storage of the error correction code value may be performed only once or periodically.

The circuit 166 may be referred to as a error correction code correction (ECC) circuit. The ECC correction circuit 166 may be operational to perform error detection and correction of the silicon ID value received in the signal INT. Error detection and correction may be determined by the error correction code value received in the signal ECC_IN. The corrected silicon ID value may be presented in the signal RID by the ECC correction circuit 166.

The present invention may also be implemented by the preparation of ASICs, FPGAs, or by interconnecting an appropriate network of conventional component circuits (such as conventional circuit implementing a state machine), as is described herein, modifications of which will be readily apparent to those skilled in the art(s).

While the invention has been particularly shown and described with reference to the preferred embodiments thereof, it will be understood by those skilled in the art that various changes in form and details may be made without departing from the spirit and scope of the invention.

The invention claimed is:

1. A method in a security application of a circuit, comprising the steps of:
   (A) generating said first identification value based on a plurality of semiconductor fabrication process variations;
   (B) generating a key by mapping a plurality of value variations of said first identification value into a single value to reduce a bit error rate of said first identification value, wherein said key is not available external to said security application;
   (C) generating an output signal of said circuit by one of (i) encoding and (ii) decoding an input signal in response to said key;
   (D) generating a second identification value (i) based on a second plurality of said semiconductor fabrication process variations and (ii) independent of said first identification value;

(F) generate a tracking value by reducing a bit error rate of said second identification value while a control signal is deasserted;

(F) presenting said tracking value external to said circuit while said control signal is said deasserted; and (G) presenting said key to said one of (i) said encoding and (ii) said decoding while said control signal is asserted.

2. The method according to claim 1, wherein said mapping comprises the sub-step of:

generating said key by surjection of said first identification value.

3. The method according to claim 1, further comprises the step of:

correcting said key in response to an error correction code value.

4. The method according to claim 3, wherein said correcting comprises the sub-step of:

reading said error correction code value from a nonvolatile memory.

5. The method according to claim 1, further comprising the step of:

generating an error correction code value based on said key.

6. The method according to claim 5, further comprising the step of:

storing said error correction code value in a nonvolatile memory.

7. The method according to claim 1, wherein said mapping comprises the sub-step of:

quantizing said first identification value.

8. The method according to claim 7, wherein said quantizing comprises the sub-steps of:

dividing said first identification value into a plurality of bins; and calculating a bit of said key from each of said bins based on a number of bits in said bins having a predetermined logical value.

9. The method according to claim 1, wherein step (B) comprises the sub-steps of:

generating an intermediate value by quantizing said first identification value;

generating an error correction code value for said intermediate value;

writing said error correction code value to a memory;

reading said error correction code value from said memory; and generating said key by correcting said intermediate value in response to said error correction code value.

10. A circuit comprising:

a first identification module configured to generate a first identification value based on a first plurality of semiconductor fabrication process variations;

a reduction module configured to generate a key by mapping a plurality of value variations of said first identification value into a single value to reduce a first bit error rate of said first identification value, wherein said key is not available external to said circuit;

a cryptography module configured to generated a first output signal by first processing a first input signal in response to said key, said first processing comprising one of encoding and decoding;

a routing module (i) presenting a tracking value external to said circuit while a control signal is deasserted and (ii) presenting said key from said reduction module to said cryptography module while said control signal is asserted;

a nonvolatile memory in communication with said reduction module to store an error correction code value; and a second identification module configured to generate a second identification value (i) based on a second plurality of said semiconductor fabrication process variations and (ii) independent of said first identification value, wherein said reduction module is further configured to generated said tracking value by reducing a second bit error rate of said second identification value while said control signal is said deasserted.

11. The circuit according to claim 10, wherein said cryptography module is further configured to generate a second output signal by second processing a second input signal in response to said key, said second processing reversing said first processing.

12. The circuit according to claim 10, wherein said cryptography module comprises one of an encoder and a decoder.

13. The circuit according to claim 10, further comprising a nonvolatile memory configured to (i) receive a tracking value from external to said circuit and (ii) present said tracking value external to said circuit.

14. The circuit according to claim 10, wherein said reduction module comprises a surjection module configured to generate said key.

15. The circuit according to claim 10, wherein said reduction module comprises a quantization module configured to generate said key by quantizing said first identification value.

16. The circuit according to claim 15, wherein said quantization module generates said key by (i) dividing said first identification value into a plurality of bins and (ii) calculates a bit of said key from each of said bins based on a number of bits in said bins having a predetermined logical value.

17. The circuit according to claim 10, wherein said reduction module comprises an error correction code module configured to correct said key with an error correction code value.

18. A circuit comprising:

means for generating a first identification value based on a plurality of semiconductor fabrication process variations;

means for generating a key by mapping a plurality of value variations of said identification value into a single value to reduce a bit error rate of said identification value, wherein said key is not available external to said circuit; and means for generating an output signal by one of (a) encoding and (b) decoding an input signal in response to said key;

means for (i) presenting a tracking value external to said circuit while a control signal is deasserted and (ii) presenting said key from a reduction module to a cryptography module while said control signal is asserted;

a nonvolatile memory in communication with said means for generating said key to store an error correction code value; and means for generating a second identification value (i) based on a second plurality of said semiconductor fabrication process variations and (ii) independent of said first identification value, wherein said means for generating said key is further configured to generate said tracking value by reducing a second bit error rate of said second identification value while said control signal is said deasserted.

* * * * *